Aug. 2, 1960  J. L. ARMENTROUT ET AL  2,947,232
COLOR PRINTING
Filed Sept. 30, 1954  4 Sheets-Sheet 1

FIG_1

FIG_3

FIG_2

INVENTOR.
James Leslie Armentrout
Ronald L. Gibson
By: J. E. Trabucco
ATTORNEY

FIG_4

Aug. 2, 1960 J. L. ARMENTROUT ET AL 2,947,232
COLOR PRINTING
Filed Sept. 30, 1954 4 Sheets-Sheet 4

FIG_6

FIG_7

INVENTOR
James Leslie Armentrout
Ronald L. Gibson
By JE Trabucco
ATTORNEY

United States Patent Office 2,947,232
Patented Aug. 2, 1960

2,947,232

COLOR PRINTING

James Leslie Armentrout and Ronald L. Gibson, both of 725 N. Western Ave., Los Angeles 29, Calif.

Filed Sept. 30, 1954, Ser. No. 459,398

2 Claims. (Cl. 95—73)

The present invention relates to color printing and more particularly to a novel method of color separation and preparation for the reproduction of a colored original by any of the graphic arts processes which are predicated on the separation of the primary colors from the art original or a color transparency.

In color printing by any of the well known graphic arts processes (from Kodachrome, Ektachrome, Anscochrome, etc.), it is first necessary to prepare color separation printing negatives, or the like, from the original art subject. Ordinarily, four separate printing negatives or plates are required, yellow, red, blue and black, and these when combined in the usual manner in producing a positive by superimposed printing, will be capable of reproducing the approximate hue and color tones of the original art subject. There are two color separation methods now in use, one being the simultaneous exposure of a number of color separation negatives to light rays from a selected art subject by means of a camera which is equipped with suitable color filters and light reflecting and transmission prisms or elements. The other method, and the one with which we are here primarily concerned, is by producing individual color separation negatives by transmitting light rays through a colored positive film or plate and each of a number of different colored filters. These are red, green and blue filters, and each is adapted to control the light reaching the sensitized film or plate so that certain colors are absorbed and others are transmitted. The exposed negative films or plates when developed are called separation negatives and each will record by the densities of the silver deposits thereon the amounts of light transmitted through its associated filter and the positive film or plate.

In the methods now commonly used in producing color separation negatives there are a number of variable factors which if not controlled are apt to produce unsatisfactory results. For instance, the light source must be such that the proper light intensity is maintained, otherwise the color of the light issuing from the filters may vary. Then also, the color filters do not always fully absorb the rays of the spectrum they are intended to absorb, but transmit portions of such light rays thereby causing supplementary exposures on a separation negative and the consequent degradation and shifting of hues and tones. The film itself is subject to wide variation of acceptance or rejection of certain elements of light color, and the dyes and inks used in the graphic arts do not have the characteristics of theoretically pure colors, which further causes a degradation of the final colors, tones or hues in the printed work. It is therefore readily perceived that these mechanical deficiencies require the exercise of considerable skill by an operator in order to make it possible for the production of an acceptable colored print.

The principles of this invention are grounded on well established and proven methods of primary color separation from an original and the preparation of material for reproduction by printing, lithography or any other dye transfer process. Commercial color printing processes now in use are costly, and usually the degree of their success is measured by the individual skill and techniques of the practicing artisan. Standardization of equipment, practices and techniques are wholly absent in the present day methods and as a result the use of color printing is too costly for many small advertisers and publishers.

The present invention provides a comparatively inexpensive method of color separation, one which utilizes mechanical operations and standardized equipment in the preparation of color separations used in color printing. The color separation method embodying our invention employs a purely mechanical set of operations controlled by a novel electronic system, and as such, unskilled or semi-skilled operators with very little training may be qualified to prepare primary color separations from an original or color transparency for use in color printing. By utilizing standardized equipment and practices in the production of color separations, the present method makes it possible for quality and fidelity in reproduction to be uniformly maintained in color printing, while at the same time greatly reducing the costs over other processes now in common use.

The primary object of the present invention is to provide a novel and inexpensive method of preparing color separations of an art original or color transparency for use in color printing.

Another object of the present invention is to provide improved apparatus for use in preparing primary color separations from an art original or color transparency.

Another object of this invention is to provide a novel electronic system for use in the control of various light and time factors related to the production of color separations by the present method.

Other and further objects of our invention will be pointed out hereinafter, or will be indicated in the appended claims, or will be obvious to one skilled in the art upon an understanding of the present disclosure. For the purpose of this application we have elected to disclose herein certain forms and details of a method and improved apparatus for preparing color separations of an art original or color transparency, representative of our invention; it is to be understood, however, that the embodiment of our invention herein shown and described is for purposes of illustration only, and that therefore it is not to be regarded as exhaustive of the variations of the invention in the art.

In carrying out our improved method we employ certain well established photo-mechanical principles which are embodied in a novel unified system

*Electronic densitometer*

Forming an integral part of our unified system is an electronic densitometer which differs from the standard densitometer now in use in that there is no provision for density readings as such, but rather the density factors are indicated by key numbers or the like which are related to certain time factors developed in a timing circuit forming a part of our invention. The physical embodiment of the densitometer is diagrammatically illustrated in Fig. 1 wherein a source of light 1 is shown as being associated with a suitable focusing device 2. Light rays from the source of light 1 proceed through a condensing lens 3 to a focal point adjacent a viewing port 4 in a translucent element 4a. The light rays from the source of light cross over and proceed through a specimen photographic positive Kodachrome 5 being read, and such rays pass through an opening in a photo tube housing 6 and are again refocused on the anode 7 of a photo tube 8. The effect of the light rays on the photo tube 8, electrically, are conveyed by suitable electrical conductors to a light unit determinator circuit, enclosed in a suitable housing as at 10 and more fully illustrated in Section B of Fig. 4. The light unit determinator circuit constitutes a part of the densitometer and it is electrically connected to a microammeter 11 which is adapted to indicate the results of the analysis of the intelligence made by means of this circuit. The dial of the microammeter 11 is designed somewhat differently than the standard microammeter, in that it indicates light units rather than microamperes.

Figure 4:
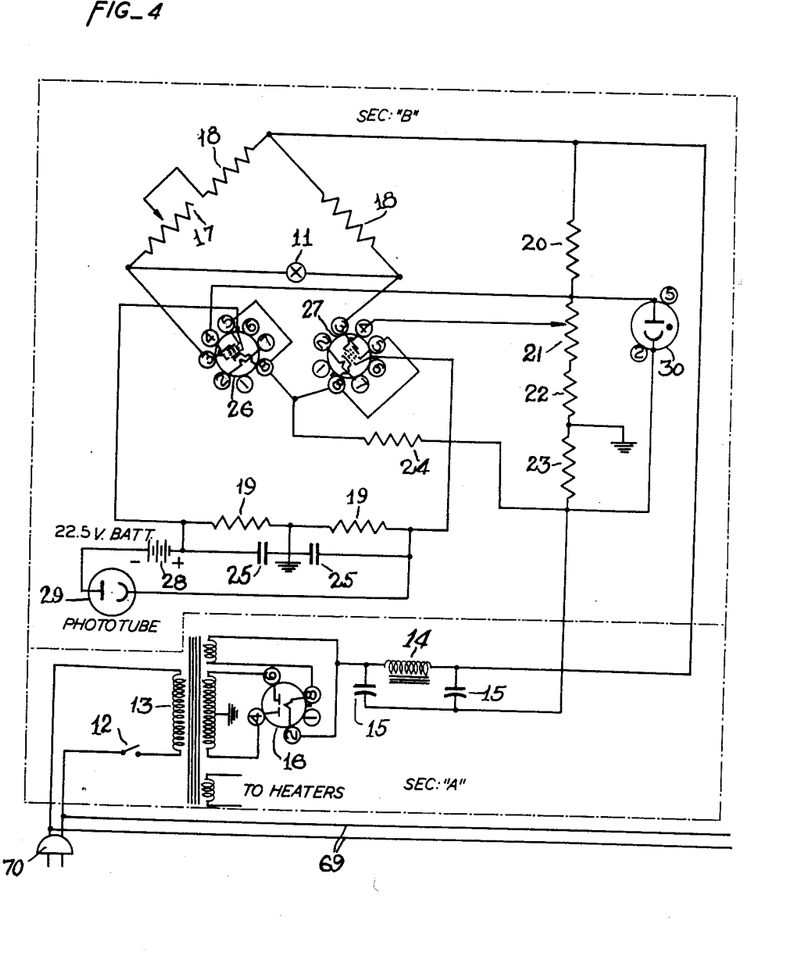
Fig. 4 is a wiring diagram showing the densitometer circuit.

The electrical densitometer, the circuits of which are shown on Fig. 4 at sections A and B, is supplied with electrical current by a high voltage power supply line. Connected as shown on the drawings in the light unit determinator circuit, Sec. A, is a toggle switch 12, a power transformer 13 (275 side ct. at 50 ma., 6.3 v. at 2.5 amp., 5 v. at 2 amp.—Thordarson T. 22R30), a filter choke (40 ma.) 14, electrolytic condensers (450 volt) 15 and a vacuum tube (5YGT) 16. In the densitometer circuit shown in Sec. B, 17 is a carbon resistor (1000 ohms, 1 watt, linear pot.), 18, 18 are carbon resistors (1 watt, 50,000 ohms), 19, 19 are carbon resistors (5 megohms, ½ watt), 20 is a carbon resistor (4 watt, 6,000 ohms), 21 is a carbon resistor (1 watt, 10,000 ohms), 22 is a carbon resistor (1 watt, 2500 ohms), 23 is a carbon resistor (1 watt, 500 ohms), 24 is a carbon resistor (1 watt, 1400 ohms), 25, 25 are ceramic condensers (.01 mfd.), 11 is the microammeter (multi-range, 0–10, 0–100, 0–1000, or 0–50 microamperes), 26 is a suitable vacuum tube, 27 is also a suitable vacuum tube, 28 is a battery (22.5 v.), 29 is a suitable phototube, and 30 is also a suitable phototube.

This circuit will measure illumination corresponding to a phototube current of only 10/10 ampere. The bridge arrangement makes the zero setting practically independent of supply-voltage variations. The use of the voltage-regulated screen supply makes the sensitivity of the circuit highly stable to supply-voltage variations. Since the drain on the 22.5 volt battery 28 is only a fraction of a microampere, it will function for a considerable period of time.

The procedure for adjusting the densitometer circuit is to reduce the phototube illumination to zero by adjusting the resistor 21 as a coarse control and resistor 17 as a fine control. The circuit is then ready for operation. Since the variation of meter current with illumination is practically linear, the circuit can be calibrated at relatively large values of illumination, and the calibration may be extended to much smaller illumination values.

Figure 1:
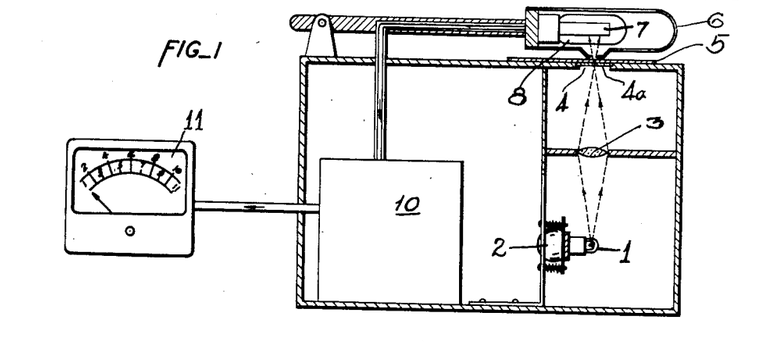
Fig. 1 is a diagrammatic view illustrating the densitometer constituting a part of our invention.

The function of the densitometer is to determine with accuracy the density of the densest shadow area presented in the original subject which is to be reproduced. Since the reading on the micrommeter 11 is the basis of all further calculations, a complete understanding of the principles involved is required. Practice has shown that any shadow density in a color positive should render as .30 density in the separation negatives. With this practical information as a basis of fact and accepting it as an ideal condition an arbitrary system of constant factors was arrived at, and to further simplify the system density readings as such are not used, but in their place a set of light unit factor numbers has been devised as shown on the microammeter dial at 11 in Fig. 1. These light unit factor numbers are directly related to density values as shown on the table below as follows:

1.7 density equals light unit factor 11
1.8 density equals light unit factor 10
1.9 density equals light unit factor 9
2.0 density equals light unit factor 8
2.1 density equals light unit factor 7
2.2 density equals light unit factor 6
2.3 density equals light unit factor 5
2.4 density equals light unit factor 4
2.5 density equals light unit factor 3
2.6 density equals light unit factor 2
2.7 density equals light unit factor 1

This table indicates that the greater the density the lower the factor number.

In practice the operator selects the greatest density in the colored photographic positive 5 which is to be reproduced and places it in the densitometer with this shadow area directly over the viewing port 4. (See Fig. 1.) When the circuit is closed, light from the light source 1 is transmitted through the viewing port 4 and thence through the selected shadow area of the positive 5 to the anode 7 of the phototube 8. The light reaching the phototube causes a plate current variance in the vacuum tubes 26 and 27 which is thereupon indicated by the microammeter 11. The greater the density of the shadow area presented to the light rays from the source of light, the less the amount of light reaching the phototube 8, and the lower the reading on the microammeter 11. When this reading has once been made, the total amount of calculation required is concluded, and the particular light factor number indicated by the pointer of the microammeter 11 will thereafter be a controlling factor in carrying out the process and in determining the exposure time required of the separation negatives.

*The electronic timer-light unit integrator*

Constituting an integral part of our invention is an electronic timer-light integrator which is capable of measuring the accumulative light rather than a time sequence. Practically all mechanical and electronic timers are subject to wide variations in timing as related to color processing. Inasmuch as light in the exposures is an accumulative factor, the problem is to determine the accumulated light at the sensitive surface of the film being exposed rather than an accumulation of time, which could vary from exposure to exposure. Also, due to line voltage fluctuations the actual value of the light may change during an exposure. In view of these variable factors we have devised a system whereby the light source is controlled to a very narrow margin of error, and in addition the exposure of the sensitized film is also controlled to a high degree of accuracy, thereby making it possible to produce color separation negatives which for all practical purposes are substantially perfect. To have an ideal condition with respect to the exposure of the shadow area of a color positive, the amount of light should be such that a density of .30 will be produced in a color separation negative regardless of the density of such shadow area. Having noted that a time unit factor number is representative of a certain density the problem then is to adjust the light unit integrator in such a manner that the accumulated light delivered by the printing lamp will cut out at precisely the correct amount to produce, with correct development, the desired .30 density in the separation negatives. The control of the printing lamp and the calibration of light duration is the function of the electronic timer-light unit integrator circuit shown in Fig. 5, Section B2, such circuit being capable of automatically controlling the amount of accumulated light reaching the sensitized surface of the film. Connected in the light unit integrator circuit is a control switch 31, a resistor (280 ohms, 25 watts) 32, a carbon resistor (50 ohms, 1 watt) 33, a phototube 34, a control condenser bank 35, a selector control for the condenser bank 36, a carbon resistor (1 megohm) 37, a condenser (250 volts, 8 mfd.) 38, a carbon resistor (5,000 ohms, 1 watt) 39, a potentiometer (5,000 ohms, 1 watt) 40, a resistor (10,000 ohms, 2 watts) 41, a condenser (250 volts, 8 mfd.) 42, a single pole switch 43, a double pole double throw toggle switch 44, a suitable vacuum tube 45, another suitable vacuum tube 46, a relay 47, and a solenoid 48 for operating a camera shutter.

Figure 2:
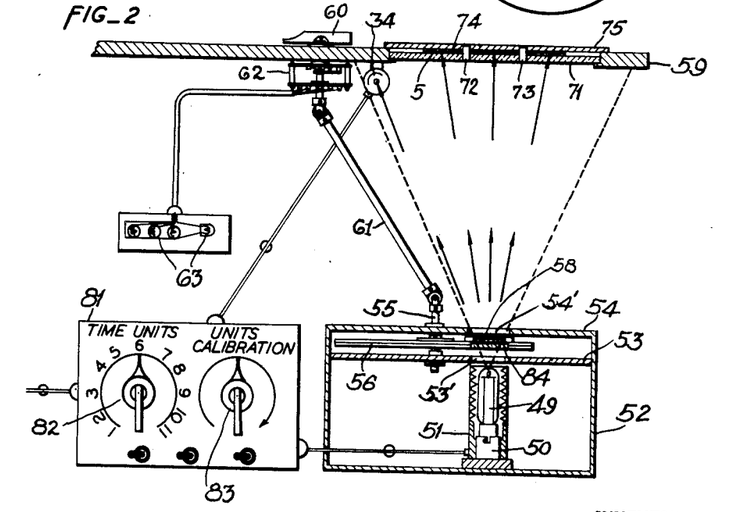
Fig. 2 is a diagrammatic view illustrating our printing apparatus and the filter control and indicator means associated therewith.

Referring particularly to Fig. 2 which illustrates diagrammatically the mechanical embodiment of the printing mechanism and the light filtering system associated with the circuit B2, the numeral 49 designates a suitable printing lamp which is supported in a light socket 50. The printing lamp embodies a construction capable of supplying light which is substantially free of light diffractions and undesirable color elements. The tip end of the printing lamp is frosted and the filament is centered and positioned in close proximity thereto. Enclosing the sides but not the outer end of the printing lamp 49 is a tubular flare shield 51 which is so constructed and arranged that internal reflections within the lamp are avoided. The flare shield is a tubular member having its inner surface blackened and provided with coarse threads, or the like. The light rays from the printing lamp are controlled by the flare shield so as to form a cone of light, such rays traveling in optically straight lines to infinity. The particular design of the printing lamp and the construction and arrangement of the flare shield have contributed substantially to the clarity of detail in the separation negatives, and have in a large measure aided the filtering system in providing very satisfactory separation of color in the separation negatives. The lamp socket 50, the flare shield 51 and the lamp 49 are positioned in a lower compartment of a housing 52, the said housing having spaced upper panels or sides 53 and 54 which are provided with vertically aligned light ports 53' and 54' respectively, the said ports being arranged directly above the tip end of the lamp 49. Keyed to a vertical filter wheel shaft 55 and mounted for rotative adjustment in the housing 52 between the panels 53 and 54 is a filter wheel 56 having four openings 57 which are preferably spaced sixty degrees apart. Suitable color filters 58 are carried on the wheel within the openings, and such openings are so positioned and arranged that each is adapted to successively register with the light ports 53' and 54' as the filter wheel is rotatively adjusted. Mounted on the top side 59 of the cabinet or housing within which various parts of the apparatus are enclosed is a filter wheel control knob 60 which is connected by a drive shaft 61 and suitable coupling means to the vertical filter wheel shaft 55. Secured to the control knob 60 is a filter index and indicator switch 62 of the rotary type, having grooves or detents which are spaced sixty degrees apart. The grooves or detents of the rotary switch and the openings 57 of the filter wheel are so arranged with respect to each other and with respect to color index markings (not shown) on the cabinet top 59 adjacent the control knob 60 that any colored filter 58 may be selectively brought into and held in a registering position with respect to the light ports 53' and 54'. Since all of the operations in producing color separation negatives must be carried out in a darkened room, suitable filter indicators capable of being seen in the dark are provided. Each of the grooves or detents of the index switch 62 is associated with a certain distinctively colored indicator lamp 63, such lamps being mounted on the top of the cabinet in plain view of the operator. Each of the indicator lamps 63 is electrically connected in a separate circuit along with a contact associated with a certain detent of the rotary index switch 62, and when the control knob 60 is adjusted to a certain index marking, the circuit of a certain indicator lamp 63 corresponding in color to the particular colored filter then brought into registry with the light ports, will be closed. A push button switch 64 shown on the wiring diagram of the filter indicator lamp circuit completes the circuit to the selected indicator lamp and causes it to be energized, thereby indicating which of the filters is then being used. The operator in a dark room may readily know when a selected filter is operatively positioned in registry with the light ports 53' and 54' by the detent action of the rotary switch and the positive holding of the knob 60 in the adjusted position.

In the indicator lamp circuit (Sec. C, Fig. 5) the four indicator lamps are shown at 63, the push button switch at 64, the filter index and indicator switch at 62 and a suitable filament transformer at 65.

In the printing lamp circuit (Sec. D, Fig. 5) the printing lamp is shown at 49, a pilot lamp at 66, a suitable transformer at 67 and a suitable light intensity control rheostat at 68. This circuit has been found to be extremely stable, controlling the light output to within one tenth of one percent even under line voltage variations.

The various circuits are connected to and supplied with electrical current by conductors 69 which are connected to a pronged plug 70 or other suitable connecting means.

Figure 6:
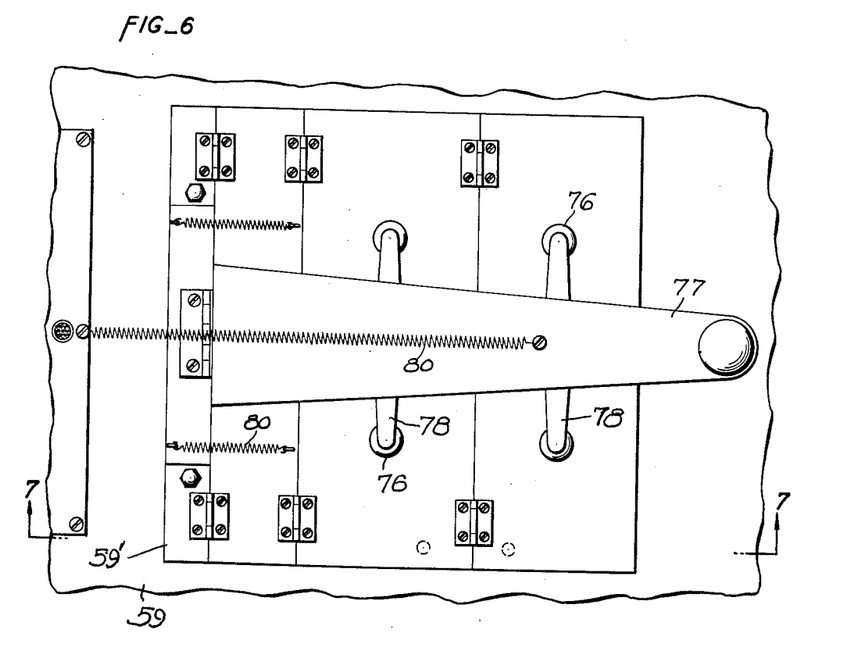
Fig. 6 is a plan view of the pressure plate for holding the sensitized film and the positive film in firmly clamped superimposed positions on the glass plate.
Figure 7:
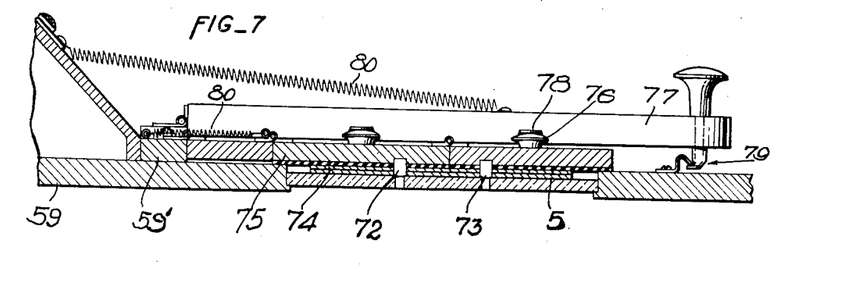
Fig. 7 is a longitudinal sectional view taken on the line 7—7 of Fig. 6.

The top 59 of the cabinet directly above the light ports 53' and 54' is provided with a large suitably shaped opening within which a water white glass plate 71 is supported in a substantially horizontal position. Supported by the top 59 of the cabinet are two suitably spaced registration lugs 72 and 73 which extend through and project above the glass plate 71 at one end thereof. In practice a color positive film or plate 5 (Kodachrome, Ektachrome, Anscochrome, etc.) from which separation negatives are to be made is supported on the glass plate 71 with a sensitized film 74 superimposed thereon. The color positive film and the sensitized film are both formed with suitable end holes within which the lugs 72 and 73 snugly fit, thereby providing suitable means for maintaining the films in fixed relative positions and for preventing the displacement of either when preparing for and during an exposure. A suitable sectioned pressure plate 75 is used to apply a downward pressure on the sensitized film 74 and the positive film or plate 5 when they are positioned on the glass plate 71. The pressure plate 75 is preferably made in sections which are hinged one to another, and one of such sections is hinged to a bar 59' affixed to the top of the cabinet. Two of the sections of the pressure plate 75 are provided with pairs of upwardly projecting knobs 76, and a hinged pressure bar 77 hinged at one end of the bar 59' carries two equalizing springs 78, the ends of which are adapted to engage with the projecting knobs to maintain a downward pressure on the pressure plate. A suitable latch means 79 carried at the free end of the pressure bar 77 is adapted to engage with a cooperating latch member secured to the top 59 of the cabinet to releasably hold the pressure bar in a position whereby the springs 78 exert a definite equalized pressure on the knobs 76 and the pressure plate. Suitable coiled springs 80 are arranged to exert an upward pull on the pressure plate 75 and the pressure bar 77.

Supported by the top 59 of the cabinet in a position where it intercepts light rays from the printing lamp 49 is the phototube 34. The phototube 34 is connected in the electronic timer-light integrator circuit (Fig. 5, Sec. B2); and as shown diagrammatically in Fig. 2 suitable electrical cables or conductors connect the phototube with other elements of the circuit housed in an enclosure as at 81.

Figure 5:
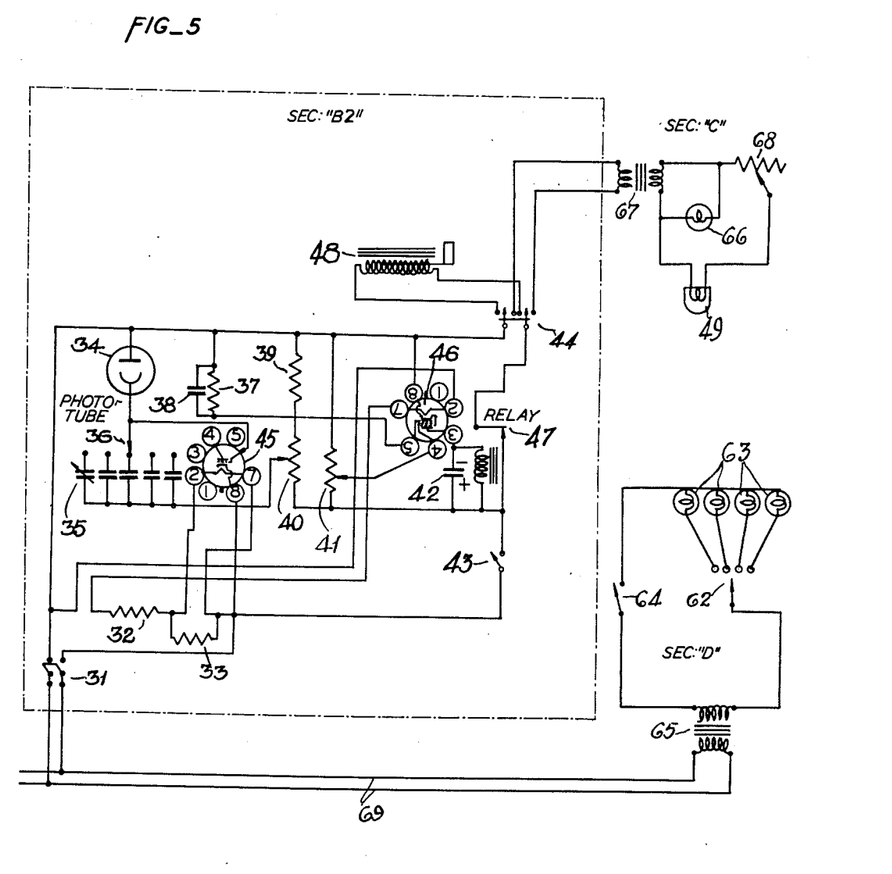
Fig. 5 is a wiring diagram showing the timer circuit, the printing lamp circuit and the filter indicator lamp circuit.

When the printing lamp circuit is energized by closing the integrator unit switch 31 and switch 64 (Fig. 5, Sec. D), light rays from the printing lamp 49 proceed through the positive film 5 and onto the sensitized film 74, and at the same time light rays from the printing lamp proceed to the phototube 34. The phototube 34, being positioned at the side of the large opening in the cabinet top over which the positive and sensitized films are supported, does not interfere in any manner with the exposure of the sensitized film. The electronic timer-light integrator circuit, upon the phototube 34 being energized, measures the product of the light intensity and duration of the illumination on this phototube and thus measures the exposure of the sensitized film 74. When the exposure has reached the calculated value, the circuit automatically opens the relay 47, thereby opening the printing lamp circuit, and automatically discontinuing the transmission of light to the sensitized film 74. The electronic timer-light integrator circuit (Sec. B2, Fig. 5) measures exposure by measuring the change in voltage across the condenser 35 which is in series with the phototube 34. This voltage change is proportional to the charge supplied by the phototube. This charge is equal to the time integral of the current flowing into the condenser 35 through the phototube. Since the phototube current is proportioned to the light coming to the phototube 34 from the printing lamp 49, the change in voltage across the condenser 35 is proportional to the exposure of the sensitized film 74.

The calibration of the light unit integrator to achieve the desired result is as follows: after selecting the greatest shadow density which is considered from practical experience to be the limit of the reproducible density, in this case a density of 2.7, this density is located on a standard photographic 21 step grey scale and a series of exposures are made of this scale on a sensitized film surface, these test exposures being made through a blue light filter. The sensitized film which is thus exposed should have the same characteristics and quality as the film which is used in production. The reason for the use of a blue light filter will be explained later. The duration of the exposures are varied by the use of the control 36 associated with the condenser bank 35 for a coarse control, and the control at 40 is used for a fine control, and further control over the quantity of light and its intensity may be accomplished by means of the rheostat 68 of the printing lamp circuit.

When the condition occasioned by the setting of these controls will produce the selected density of 2.7 as .30 in the test negative, these positions are noted; and by resetting to these index points the same condition will always repeat itself and a 2.7 density will always render a density of .30 in the test negative. These tests are repeated for all the densities listed on the table hereinabove set forth under the title "Electronic densitometer," and when by test and result the proper setting of controls is determined these index points are marked with their representative light unit factor numbers.

Figure 3:
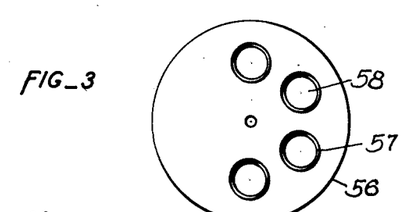
Fig. 3 is a plan view of the filter wheel.

From the foregoing it will be noted that once a light unit factor number is ascertained by reading the densitometer, the density of the original shadow area is determined automatically and then by setting the controls 82 and 83 of the light unit integrator on the enclosure 81 (Fig. 3) to the corresponding time unit markings, the result must always read a .30 rendering in the separation negative regardless of the original density presented in the shadow area of the colored positive film 5.

It is to be noted that after determining the resultant desired shadow density in a separation negative, mechanical changes are required in the filters themselves. In the present invention blue, red and green filters are used, and it is well known that these different colored light filters have different transmission factors. As a consequence different quantities of light must be transmitted through these filters to effect an equal exposure on a sensitized film. Such differences are commonly known as "filter factors." The blue filter has a factor of 10, the red filter 8 and the green filter 8, and since the blue filter has the highest factor it is used as a basis for the required calculation in equalizing the densities so as to give the filters equal light transmission characteristics. Having once determined the light transmission of the blue filter and the number of light units required to perform the exposure function, we then use this as a basis for calibrating the other filters and their equalization requirements with respect to the blue filter. Inasmuch as the sensitized film itself reacts differently to light passing through different color filters, the factors presented are not usable in the calibration, but, rather, the transmission factors must be used. The red filter having a transmission factor equivalent to one quarter of the blue filter, a neutral density filter 84 of 0.60 density, transmitting twenty-five percent is mounted on the filter wheel 56, in a registering position with respect to the red filter. Since the green filter has a transmission factor of one-third that of the blue filter, a neutral density filter of .50 density, transmitting thirty-three and a third percent transmission is used with such green filter. This condition will vary from unit to unit due to the component differences in the electronic circuits, and also due to transmission factor differences in the filters themselves.

Stating the foregoing briefly, neutral density filters of the required density are used in combination with the two filters (red and green) having a higher transmission factor than the blue filter, such neutral density filters bringing the higher transmission factor filters into balance with one another and with the blue filter so they all have the same transmission factor range. When this condition is present the index markings of the light unit integrator will hold for all three filters, and any exposure of a sensitized film 74 to light rays passing through any one of the three filters will be equal to each of the other two.

For purposes of calibration and to prove the balance of the filters, a series of exposures are made on a sensitized film through a 21 step grey scale, and for each light unit index used, the represented negative grey scales should all read with equal density through their density range.

Development and gamma

In the foregoing reference was made only to the achievement of balance in densities of the separation negatives with respect to the shadow end of the reproductive scale. We will now describe the method by which the gamma and density range of the separation negatives may be predetermined, once the shadow end has been satisfactorily resolved. Having ascertained that it is practical by the use of the exposure analyzer in conjunction with the light unit integrator to reproduce a given shadow density at a predetermined rendering with equal exposure with respect to all filters, it now becomes necessary to bring about an equalization of densities in the highlight areas. The reproduction of the highlight area has long been established a property of negative development time, and such development time is a predetermined factor and is made so by the use of time-gamma charts.

Gamma is best stated as the density differential between highlight and shadow in a separation negative, and since this determines the upper end of any required density range, it is important to properly ascertain this factor. The basis of this predetermination is the time-gamma charts, which are a series of exposures on a sensitized film from a standard 21 step grey scale. By using a constant-time-light factor, development of the negatives is varied over a usable range of times. After development of the resultant negatives, the grey scales are plotted on density graph sheets, from these graphs another plot is made on another graph sheet with the time of development as the lower axis as against gamma or the vertical axis. To predetermine any particular gamma, find it on the gamma axis, then draw a horizontal line to an intersection of the development curve, from that point drop a perpendicular line to the time axis. By negative development to the indicated time a predetermined gamma is automatically achieved.

By utilizing this intelligence coupled with the controlled exposure factors, the result must then be a set of separation negatives having perfect balance. The shadow density is determined by exposure and the highlight density is determined by the time-gamma calculation. In using the predetermined .30 rendering of any shadow density as a critical axis, then by use of the time-gamma chart any predetermined density range may be achieved by purely mechanical means.

Once the development times of the various negatives are determined, these times must be rigidly adhered to, and inasmuch as there are numerous methods of agitation none will be discussed in detail. Suffice it to say that whatever method of agitation is used during the tests, this same method must be rigidly followed in production work. The careless timing of development, disregard of development temperature, the use of exhausted solutions or improper agitation can easily bring about unsatisfactory results. It is important in placing the undeveloped separation negatives in the developing hangers that all film is positioned, with respect to its identification notch, in identical positions. The separation negatives should be kept separate; that is, the blue record is kept separately, and likewise the red and the green, the reason for this being that there is a development time difference which is shown at the time the time-gamma charts are made, and as this will vary with different shop conditions, and with the chemicals used, no detailed discussion is needed, particularly since detailed development techniques must be worked out under surrounding shop conditions.

Black printer

The use of a black printer to add density to a separation negative is sometimes required, particularly when the dyes and inks used in the process are not stable. Theoretically, the ideal black printer is one containing only the grey factors present in any chromatic art. The black printer used in the present invention satisfactorily meets this condition. Using the total time-unit factor as a basis, a sensitized film is successively exposed to light rays passing through each of the filters (blue, red, and green), with one-third the basic time factor being used in each exposure. By these successive exposures only the grey factors in the original positive are rendered in a separation negative, the reason for this being that with the successive exposures through the three color filters, such filters will cancel out their primary color factors present in the original positive, thereupon leaving only the true tones of grey value that are present in such original.

Color correction

Color correction is required in a separation negative because the available inks and dyes used in the graphic arts processes do not have the characteristics of theoretically pure color. The causes of reproduction error are not peculiar to any one process, but are inherent in all of the graphic arts processes. A color transparency is only an approximation of the original subject, and when such transparency is subjected to separation and further processing it then becomes an "approximation of an approximation," and is often not usable in practical production work. In the case of a flat or reflection copy, this same effect holds true, but to a lesser degree.

In order to obtain satisfactory reproduction correction is necessary, first, to compensate for the dyes in the color film or original art, secondly, correction is necessary for relative brightness range and saturation errors caused in the color separation negatives by filter errors. The foregoing evinces itself in:

(1) Too high a saturation of the reds in the blues, cyan, dark greens and the hues of these colors;
(2) Too much yellow in the violet, crimson, and magenta hues.

The effect of this contamination is a degradation of color as follows:

(1) The cool colors are darkened and the hues degraded. Dark greens will saturate red to the point where brown or black is reproduced. The middle tones of the greens are darkened far beyond normal coloring.
(2) Violet and orchid colors are blackened, the crimson shifting toward a scarlet color, and the true magentas are degraded to the extent that they lack sparkle and brilliance in the final reproduction.

Further, there are certain considerations required of the color filters themselves, and although filters with a very narrow transmission band may be selected, it is mechanically impossible to devise a filter capable of cutting out or filtering only those color factors within its spectral range. To illustrate, theoretically the cyan or blue image should control only the red light, but the fact remains that the image in these areas is not completely transparent or will not absorb all of the blue and green light, therefore supplementary exposures take place when blue and green records are made of the other dye layers.

For the same reason, when magenta is filtered with the blue filter it produces an image not totally transparent to light of that color, thus the red filter separation negative is a record of the blues or the cyans alone, the green filter separation negative is a record of the magenta and also the cyans to a lesser degree, and the blue filter negative is primarily a record of the yellows, but it is also a record of the cyan and magenta dyes.

Exhaustive tests have been made to determine the most suitable means for correcting these errors, and it has been found that the after-masking of the separation negatives has been the most satisfactory method from the viewpoint of fuller correction and more complete control over the correction effected. By after-masking we provide a local correction within the areas of the separation negatives most acutely needing such correction. The masks used are weak, underexposed, underdeveloped positive transparencies made from the separation negatives themselves. These masks when properly made and superimposed in registry with the separation negatives, may be made to correct the errors mentioned above to an amount of approximately niety-five percent, thereby altering the hue shifts created by these errors and avoiding a degradation of the colors.

These masks are made as follows: two positive masks are made from the blue printer separation negative, and these are superimposed upon the red and blue separation negatives, and one mask is made from the red printer separation negative, and this is to be superimposed upon the yellow printer. These masks are in the order of twenty-five percent of density value by the grey scale as is represented in the separation negatives. This percentage should be considered the minimum of masking correction, but may be extended to forty percent in order to more fully correct the errors present.

Observation of the uncorrected separation negatives will show density in the same areas as will the mask made from that negative. The most important mask is that made from the blue printer negative. In those areas of the separation negatives, which require the reduction of red, there is sufficient density. In respect to a weak transparent positive, when the mask made from the blue printer is superimposed on the blue printer negative, there is no change in color values, but the effect is only that of reducing the contrast in the final result.

However, when a mask made from the blue printer negative is superimposed in registry with the red printer negative, the alteration in color balance is immediately apparent. The low density areas, which are limited to the portion of a separation negative requiring correction, have the effect of reducing the density of the red which will print in the blue and green area of the subject.

By this, the correction of the cold colors is effected, and the positive mask from the blue printer superimposed on the red negative automatically reduces the saturation in the selected highlight and middle-tone areas.

The yellow printer is corrected by using a positive mask from the red printer negative. The aforementioned observation will show that in all those areas where it is desired that the yellows which degrade the colors, be eliminated or reduced, there is some density in the red printer negative. By superimposing the positive mask from th red printer negative over the yellow printer negative, there will be a reduction of the yellow which degrades the violet, blue, cyan and magenta.

This method of masking, gives a full color correction for all practical purposes, but in a few instances in production work it may be advisable to alter local areas by dot etching.

In practicing our invention the following steps are followed:

(1) A sensitized film 74 is suitably punched to provide holes for mounting such film on the registration lugs 72 and 73.

(2) The color positive film (Kodachrome, Ektachrome, Anscochrome, etc.) is read in the densitometer (see Fig. 1) so as to determine the density of the deepest shadow area. As heretofore explained this density reading does not show on the microammeter 11 as density, but as a time-unit factor number.

(3) For illustration purposes, assuming the time-unit factor number is 8, this number is then brought into the light unit integrator by the use of the controls 82 and 83 and the index numbers associated therewith. The separator unit is then ready for operation.

(4) The color positive film or plate 5 is mounted on the registering lugs 72 and 73 in a position resting on the glass plate 71. The use of tape to secure the positive film in place may sometimes be advisable.

(5) The room lights are turned out and the prepunched sensitized negative film 74 is mounted on the lugs 72 and 73 in a superimposed position with respect to the positive film 5, and the pressure plate 75 is then clamped down over the negative film. The red light filter 58 is brought into a registering position with respect to the light ports 53' and 54' by the turning of the filter wheel 57 through the suitable adjustment of the control knob 60. The light unit integrator switch 31 is closed, and upon the printing lamp 49 being energized light rays proceed through the red light filter 58 and positive film 73 onto the sensitized film 74. As the exposure progresses light rays from the printing lamp also proceed through the filter to the phototube 34, and at the precise point when sufficient light to achieve the desired density in the sensitized film 74 has been received by said film and the phototube, the light integrator automatically cuts out, by the opening of the circuit, the printing lamp is de-energized and the exposure of the red filter cyan printer (sensitized film 74) has been completed. The then exposed film 74 is detached from the registering lugs 72 and 73 and removed to a box or receptacle from which all light is excluded. Another piece or section of sensitized film 74 is placed in an operative position upon the positive film 5 as hereinabove described, and the filter wheel 56 is again adjusted by the control knob 60 to bring the green filter 58 into registry with the light ports 53' and 54'. The same procedure is repeated as that described with respect to the red filter, and the sensitized film 74 thus exposed to light rays passing through the green filter provides a magenta printer. Similarly, a third piece or section of sensitized film 74 is exposed to light rays passing through the blue filter 58, thus producing a yellow printer.

(6) The separation negatives having been exposed, must now be developed. The separation negatives are then developed, preferably, in the manner heretofore described.

(7) The separation negatives having been developed and thoroughly dried are each read on the densitometer and charted on a density graph to determine their density range, gamma and their relation to one another. Assuming the relations thus determined are correct, the masks are then made.

(8) In making the masks it is assumed that the predetermined average mask percentage has been determined. This percentage determination is then used to calibrate the white light factor of the light unit integrator to perform a calibration for this percentage in the same manner the light unit integrator was calibrated for the filter exposures.

(9) The separation negatives are again each separately mounted on the registering lugs 72 with their emulsion side uppermost. The mask made from the red printer is superimposed on and arranged in a registering position with respect to the yellow printer, and the two masks made from the blue printer are superimposed on and registered with each of the red and blue printers.

(10) The separation negatives are now complete and corrected and by the fact that these separation negatives are 1:1:1 the problem of later processing for any of the graphic arts processes is greatly simplified in that once a calibration of the following process is made, it then becomes an entirely repetitive process for all later sets of color separation negatives being produced on our color separator apparatus with this set of established calibrations.

What we claim is:

1. In apparatus for producing color separation negatives, an electrical circuit, a printing lamp, a plurality of different colored electric lamps connected in the circuit, a selector switch connected in the circuit and having means for selectively closing the circuit to any one of the lamps at a time, a film support positioned in light receiving relation to the light source, a rotatively adjustable filter wheel carrying a plurality of different colored light filters, the said filters coresponding in color to the lamps, the said filters being arranged to be selectively positioned in the path of the light rays proceeding from the printing lamp to the film support, and a hand control connected to both the selector switch and the filter wheel for simultaneously operating the selector switch and rotating the filter wheel, whereby a certain colored light filter may be positioned to intercept light rays proceeding from the printing lamp to the film support at the same time the circuit to an associated lamp is closed.

2. In apparatus for producing color separation negatives, a printing lamp, a film support positioned in light receiving relation to the printing lamp, a filter wheel carrying a plurality of different colored light filters arranged to be selectively brought into a position intercepting light proceeding from the printing lamp to the film support, an electrical circuit, a plurality of different colored electric lamps corresponding in color to the color filters, a selector switch connected in the circuit and having contact means for selectively closing the circuit to any one of the lamps at a time, and a common control for operating the selector switch and the filter wheel, whereby a certain colored lamp may be energized at the same time a correspondingly colored filter is in operative light intercepting position between the printing lamp and the film support.

References Cited in the file of this patent

UNITED STATES PATENTS

| | | |
|---|---|---|
| 2,011,544 | Rodman | Aug. 13, 1935 |
| 2,117,727 | Jones | May 17, 1938 |
| 2,122,689 | Jones | July 5, 1938 |
| 2,213,382 | Busse | Sept. 3, 1940 |

(Other references on following page)

UNITED STATES PATENTS

| | | |
|---|---|---|
| 2,254,878 | Adams | Sept. 2, 1941 |
| 2,255,811 | Richards | Sept. 16, 1941 |
| 2,269,161 | Morse | Jan. 6, 1942 |
| 2,300,970 | Riess | Nov. 3, 1942 |
| 2,346,988 | Noel | Apr. 18, 1944 |
| 2,359,784 | Paulas | Oct. 10, 1944 |
| 2,402,660 | O'Grady | June 25, 1946 |
| 2,438,219 | Johnston | Mar. 23, 1948 |
| 2,438,303 | Simmon | Mar. 23, 1948 |
| 2,464,761 | Haff | Mar. 15, 1949 |
| 2,474,958 | Richards | July 5, 1949 |
| 2,501,365 | Varden | Mar. 21, 1950 |
| 2,553,421 | Monsen | May 15, 1951 |
| 2,566,277 | Williams et al. | Aug. 28, 1951 |
| 2,571,697 | Evans | Oct. 16, 1951 |
| 2,654,858 | Feller | Oct. 6, 1953 |
| 2,659,268 | Grand | Nov. 17, 1953 |